May 21, 1935.　　　C. KEMP ET AL　　　2,002,014
LOCK
Filed April 5, 1933　　　5 Sheets-Sheet 1

INVENTORS
CHARLES KEMP
BY　IRVING KEMP
ATTORNEY

INVENTORS
CHARLES KEMP
IRVING KEMP
BY
ATTORNEY

May 21, 1935.  C. KEMP ET AL  2,002,014
LOCK
Filed April 5, 1933   5 Sheets-Sheet 3

INVENTORS
CHARLES KEMP
IRVING KEMP
BY
ATTORNEY

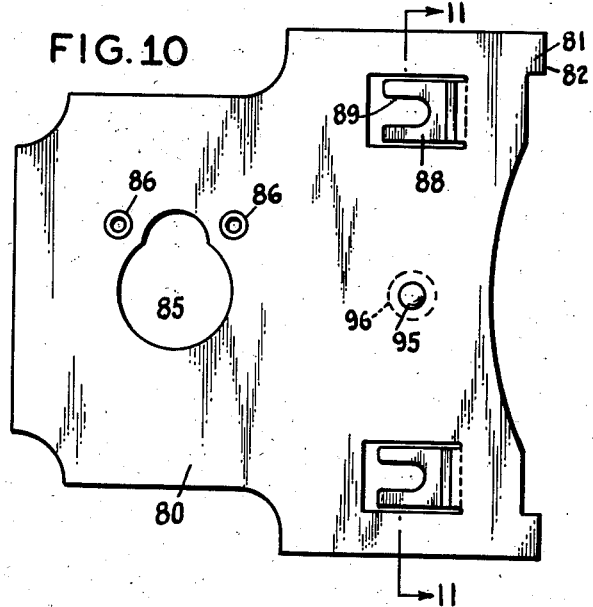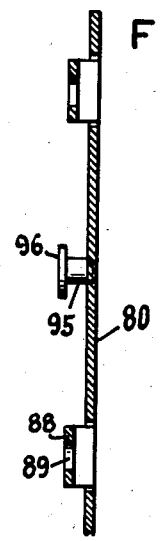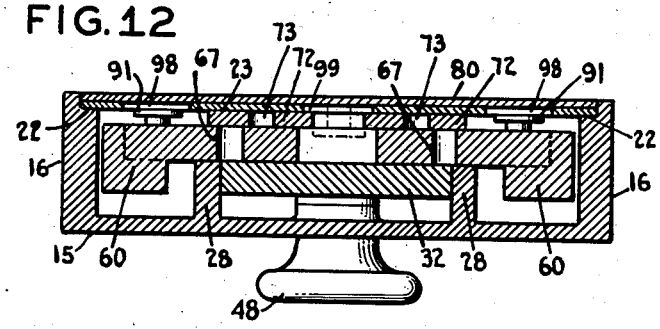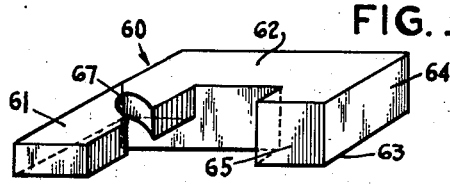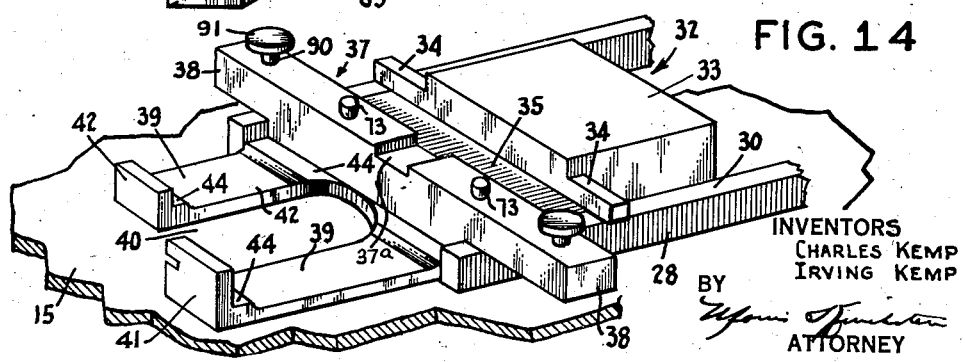

May 21, 1935.  C. KEMP ET AL  2,002,014
LOCK
Filed April 5, 1933   5 Sheets-Sheet 5

Inventors:
CHARLES KEMP AND
IRVING KEMP
by their Attorney

Patented May 21, 1935

2,002,014

UNITED STATES PATENT OFFICE 2,002,014

LOCK

Charles Kemp and Irving Kemp, New York, N. Y.

Application April 5, 1933, Serial No. 664,474

5 Claims. (Cl. 70—74)

This invention relates to locks. It is particularly directed to a lock adapted to be attached to a door and actuated from opposite sides thereof, for example, on one side by a hand knob and on the opposite side by a key, and wherein upon locking the lock with a key from the outside the lock cannot be opened from the inside by turning the handknob. With locks of this character, it has heretofore been possible to surreptitiously remove the lock off the door from the inside, for example, by a burglar breaking into a premises through a window, by first unscrewing the screws, which attach the lock casing to the door.

It is therefore an object of the invention to prevent the removal of the lock from the door without first opening the lock in the proper manner so that even though the screws are removed from the lock casing, the lock cannot be removed from the door and remains in locked condition.

A further object of this invention is to provide an improved lock having a central horizontal bolt and a pair of symmetrical, vertical bolts normally wholly contained within the lock casing when in unlocked condition, and adapted to be projected into engagement with a keeper on the door jamb, the construction of the lock being such as to permit the same to be embodied in a rim lock or mortise lock.

A still further object of this invention is to provide a neat, compact and rugged jimmy-proof lock of the character described, comprising comparatively few and simple parts, which shall be easy to manipulate, positive and smooth in action, relatively inexpensive to manufacture, and nevertheless practical and efficient to a high degree in use.

Other objects of this invention will in part be obvious and in part hereinafter pointed out.

The invention accordingly consists in the features of construction, combinations of elements, and arrangement of parts which will be exemplified in the construction hereinafter described, and of which the scope of application will be indicated in the following claims.

In the accompanying drawings, in which is shown one of the various possible illustrative embodiments of this invention, Fig. 1 is a side elevational view of a door and door jamb and showing a mortise lock embodying the invention in dotted lines;

Fig. 10 is an interior top plan view of the improved location plate for the lock shown in Fig. 5;

Fig. 11 is a cross-sectional view taken on line 11—11 of Fig. 10;

Fig. 12 is a cross-sectional view taken on line 12—12 of Fig. 5;

Fig. 13 is a perspective view of one of the vertical bolts shown in Fig. 5;

Fig. 14 is a perspective view of the horizontal bolt and part of the lock casing;

Figure 1:
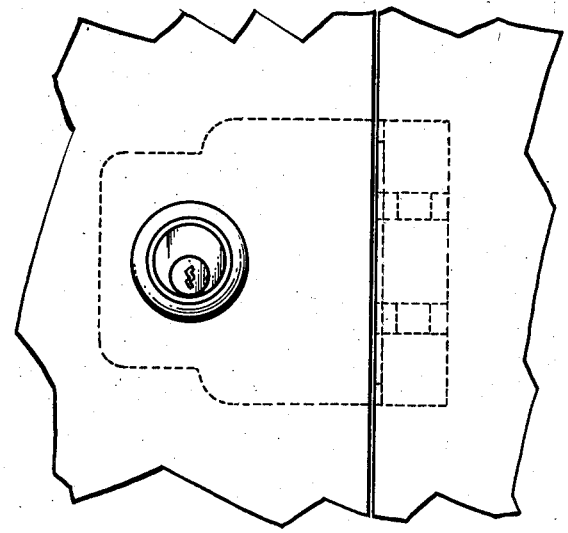

Referring now in detail to the drawings, and particularly to Figs. 3, 4, 5, 6, 7, 8, 10, 11, 12 and 13, 10 designates a door to which there is attached a lock 11 embodying the invention and cooperating with a keeper 12 fixed to a door jamb 13. The lock 11 comprises a casing 14 having a front wall 15, top and bottom walls 16, an end wall 17 removed from the edge of the door 10 and an end wall 19 adjacent said edge. The rear of the lock is open and the walls 16 and 17 are formed with internal shoulders 22 for receiving a rear cover plate 23 fixed thereto and described in greater detail hereinafter.

The end wall 19 of the casing is formed with a central opening 26 and a pair of openings 27 on opposite sides of said central opening. Extending from the front wall 15 are a pair of parallel integral guide walls 28, said walls extending to the end wall 19 and terminating as at 29, short of the end wall 17 of the casing. The guide walls 28 furthermore, are substantially half the height of the top and bottom walls 16 and are formed with front edges 30. Disposed within the casing is a horizontal or main bolt 32, shown in detail in Fig. 14. Said bolt comprises a portion 33 adapted to pass through the opening 26 in the end wall 19 of the casing and contacting the inner surfaces of the guide walls 28.

Extending from said portion 33 are extending arms 34 contacting the edges 30 of the guide walls 28. The top surface of the bolt 32 is furthermore formed with a groove 35, the bottom surface of which is preferably substantially flush with the edges 30 of said guide walls. The bolt is furthermore formed with a portion 37 parallel to the groove 35 and having extensions 38 overlapping the side edges 30 and extending beyond the guide walls in opposite directions. Extending from the portion 37 are flat portions 39 substantially contacting the inner surface of the front wall 15 and separated by a central cut-out portion 40 forming arms 41 and 42 having coplanar surfaces 44, for the purpose hereinafter appearing.

Means is provided for reciprocating the bolt 32. To this end, there is mounted on the surfaces 44 of the arms 41 and 42, an angle-shaped member 46 described in greater detail in our co-pending application, Serial No. 606,499, filed April 20, 1932. As described in our said co-pending application, the member 46 is adapted to be reciprocated on said portion 39 for movement in a direction perpendicular to the longitudinal axis of the bolt 32. The member 46 is provided with a tubular member 47 having a semi-circular portion 47a and having a through opening 51.

A hand knob 48 journaled to the wall 15 of the casing, is provided with an arm 49 having a pin 50 received within the opening 51 of the tubular member 47. It will now be understood that as the knob 48 is turned, the arm 49 will cause the plate 46 to be reciprocated with respect to the bolt 32 for causing reciprocation of said bolt, whereby the portion 33 of the latter may be projected through the opening 26 and retracted into the casing. A coil torsion spring 52, such as described in our said co-pending application, may be provided for retaining the bolt at the ends of its strokes.

Means is further provided for reciprocating the bolt by means of a key actuated mechanism and for preventing retraction of the bolt by means of the knob after the same has been projected by means of the key, and for preventing retraction of the bolt by means of the key after the same has been projected by means of the knob. This structure is similar to the structure described and claimed in the patent of Frederick W. Heyel, No. 1,908,980 issued May 16, 1933, and consists generally of a plate 54 rotatably mounted on a cover plate 23 and having an opening 55 formed with a pair of opposite angular segments 56, 57 to give the usual key bar a lost motion of 90°. Fixed to the plate 54 and projecting toward the front wall 15, are a pair of pins 58 and 59. The smaller pin 58 only is adapted to be received within the semi-circular portion 47a and the other pin 59 is adapted to contact said portion. The operation of the mechanism is described in detail in said patent of Frederick W. Heyel, said mechanism being so constructed that upon locking the lock by means of the key actuated mechanism, the lock can only be opened by means of the key actuated mechanism, and cannot be opened by turning the knob 48; and further upon locking the lock by turning the knob 48, the lock can only be opened by turning the knob in an opposite direction, and cannot be opened by the key actuated mechanism.

Figure 15:
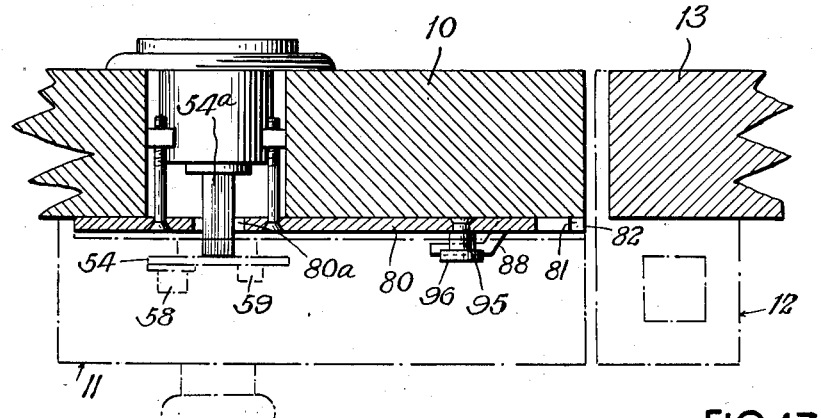
Fig. 15 is a horizontal, cross-sectional view of the location plate attached to the door and showing the lock and keeper in dot-dash lines.
Figures 16, 17:
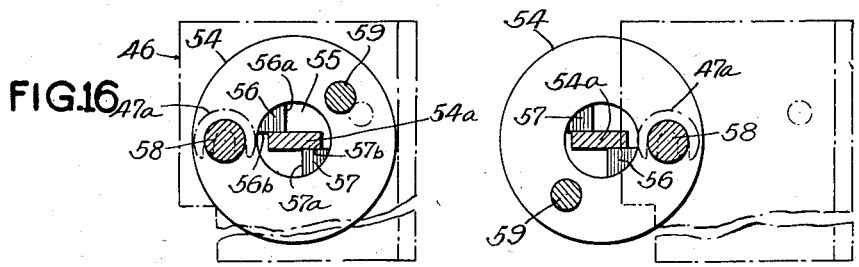
Fig. 16 is an elevational, diagrammatic view of the seating mechanism, looking toward the inner side of the rear cover plate and showing the portion of the seating disc and the reciprocating plate when the lock is open.
Fig. 17 is a view similar to Fig. 16 but showing the parts when closed by the key but before removing the key from the lock.

In Fig. 15 the location plate is shown as attached to the key tumbler and the door in the usual manner, and is provided with the usual opening 18a receiving the usual flat, elongated actuating strip 54a, turned by the key and projecting from the key tumbler. The strip 54a extends within the opening 55 in the disc 54 and is adapted to engage the opposite angular segments 56, 57. In Fig. 16 the segment 56 is designated on the drawings by oblique cross-sectional lines, and the vertical edge thereof is indicated by numeral 56a and the horizontal edge thereof by numeral 56b. The angular segment 57 in Fig. 16 is designated on the drawings by vertical, cross-sectional lines and the vertical edge thereof designated by numeral 57a and the horizontal edge thereof by numeral 57b. As shown in Fig. 16, the strip 54a contacts the edges 56b, 57b of the segments 56, 57.

Fig. 16 shows the position of the disc 54, sliding plate 46, the pin 58 and projection 59, the actuating strip 54a and the angular segmental shaped projections 56 and 57. In said figure, the parts are shown in position when the door is unlocked, the plate 48 being at the left. For closing the lock by means of the key, the key is turned in the direction for moving the actuating strip 54a in a clockwise direction, looking at Fig. 16, said movement causing rotation of the disc 54 by reason of the interengagement of said strip with the angular portions 56, 57. Rotation of the key through 180° will cause the pin 58 to engage the semi-circular portion 110 of the plate 46 and move the same to the position shown in Fig. 17 for projecting both the horizontal and the vertical bolts simultaneously, and locking the door. Before the key can be removed however, from the key tumbler, said key must be turned 180° in the same direction to the position shown in Fig. 18. During this latter movement, the projection 59 will have been moved into contact with the upper and outer surface of said semi-circular portion 47a. The plate 46 will not move during the last 180° rotation of the key since the pin 58 will merely move away from said semi-circular portion.

Figures 18, 19:
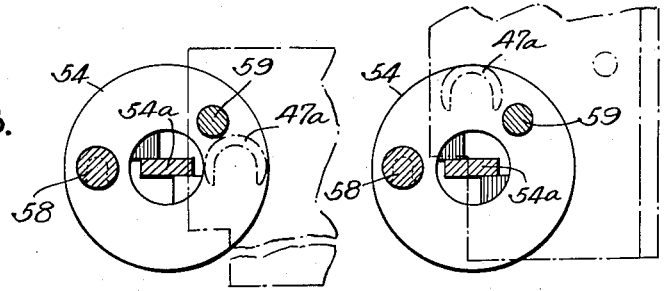
Fig. 18 is a view similar to Fig. 17 but showing the parts with the key removed from the door after the lock has been closed by said key.
Fig. 19 is a view similar to Fig. 16 but showing the intermediate position of the parts when closing the same by means of the knob.

It will now be seen that with the parts in the position shown in Fig. 18, the lock may not be opened from the inside by means of the knob 48, since to do so, the knob must be moved in a counterclockwise direction for rotating the semi-circular portion 47a likewise in a counterclockwise direction. Such latter movement is not possible since the pin 50 which engages within the bearing opening 51 of the plate 46 will move the portion 47a of said plate against the pin or projection 59. Said projection is fixed to the disc 54 which cannot rotate in a counterclockwise direction, because of the interengagement of the segmental portions 56 and 57 with the actuating strip 54a held in locked position by the tumblers of the lock. Thus, after the lock has been locked by the key, it can only be opened by the key.

When the lock is open and the parts are in the position shown in Fig. 16, the door may be locked from the inside by means of the knob 48. When locking the door from the inside the pin 50 moves the plate to the position shown in Fig. 19 without turning the disc 103, since the portion 47a of said plate will move off the pin 58. However, when said portion 47 engages the projection 59, the disc will be rotated in a clockwise direction for bringing the parts to the position shown in Fig. 20. In this position, the projection 59 will be below the portion 47.

Figure 20:
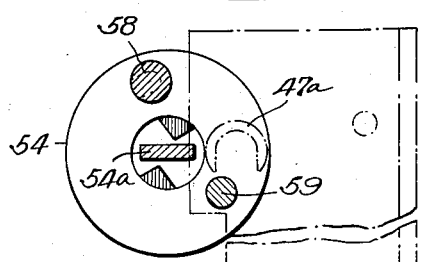
Fig. 20 is a view similar to Fig. 16 but showing the position of the parts when completely closed by the knob.

It will be noted that during the last portion of the movement, rotation of the disc will bring the segmental portions 56, 57 to the position shown in Fig. 20 of the drawings without obstruction from the strip 54a. With the parts as shown in Fig. 20, the lock having been locked by means of the knob from the inside, said lock cannot be opened by the key from the outside, since turning movement of the key in a counterclockwise direction will cause the strip 54a to engage the segmental portions 56, 57 of the disc 54.

The disc however, cannot rotate counterclockwise because its projection 59 is in contact with the portion 47a of the plate 46. Said projection 59 cannot, however, enter the semi-circular opening of said portion 47a and therefore cannot retract the plate. It will be noted that the bolt slidably receives the plate 46 and the knob is provided with an arm having a pin at the end thereof pivoted to the bearing 51 aligned with the semi-circular portion 47. Thus an upward pressure on the portion 47a cannot cause reciprocation of the plate for retracting the bolt. Said bolt can be retracted only when a pin enters the semicircular portion 47 and the disc is rotated. A pressure directly upwardly, however, does not have any component to pull the plate to the left. It is only when the pin 58 engages within the semi-circular opening of said portion 47 and the disc is turned, that a rotative force on the disc will cause a pull on the plate having component force directed to the left for pulling the horizontal bolt to the left to the retracted position thereof. However, movement of the knob 48 in a counterclockwise direction will cause, due to the interengagement of the pin 50 within the bearing 51, movement of the plate member for retracting the bolts and opening the lock. Thus, once the lock is closed by the knob, it can only be opened by the knob.

Slidably mounted on the bolt 32 for movement in a vertical direction with respect to said bolt are a pair of similar, symmetrically disposed bolts 60 one of which is shown in detail in Fig. 13 of the drawings. Each bolt 60 is provided with an arm 61 received within the groove 35 and contacting the bottom surface of the groove and the edge 30 of one of the guides 28. Extending from the arm 61 is an arm 62 disposed at right angles to the arm 61 and extending toward the end wall 19 of the casing. It will be noted that the arm 62 is thicker than the arm 61 and extends toward the wall 15 of the casing. Extending from the wall 62 is an arm 63 parallel to the arm 61. The outer surface 64 of the arm 63 is of substantially the same size as one of the openings 27, so that the bolts 60 may move with the horizontal bolts 32 to project all three bolts from the casing simultaneously. The inner surface 65 of the arm 63 substantially contacts one of the guide walls 28, said guide walls being disposed adjacent the inner ends of the openings 27. For the purpose hereinafter appearing, each arm 62 is provided with a notch 67 on the edge thereof adjacent the arm 63.

The keeper 12 mounted on the door jamb 11 is provided with a wall 70 having a pair of openings 27a for receiving the arms 63 of the bolt 60, and with an opening 26a for receiving the portion 33 of the horizontal bolt 32. Said keeper 12 is further formed with a pair of spaced, square openings 63a, for the purpose hereinafter appearing.

It will now be understood that upon operation of the key actuated mechanism or the knob 48, the central or horizontal bolt 32 together with its vertical bolt 60, may be moved to the right to project the portion 33 of the central bolt and the portions 63 of the bolt through the openings 26a and 27a, respectively, of the keeper 12. Means is provided for moving the bolts 60 toward one another for engaging the arm 63 within the opening 63a after said arms 63 have passed through the openings 27a. To this end, the cover plate 23 is formed with a pair of pins 71 symmetrically disposed with respect to the longitudinal mid-section of the cover plate and extending inwardly toward the wall 15. Pivoted to said pins 71 are a pair of similar, symmetrically disposed plates 72, said plates being pivoted at one end thereof to said pins 71 and contacting the upper surface of the portion 37 of the bolt 32. Extending from said portion 37 toward the cover plate, are a pair of pins 73 likewise symmetrically disposed with respect to the horizontal mid-section of the cover plate. The plates 72 are provided with symmetrically disposed slots 75 having portions 76 normally parallel to one another during the first portion of the projecting movement of the horizontal bolt. Extending from the portions 76 of the slots are portions 77. These extend outwardly at an angle to said portions 76 so that as the horizontal bolt is projected, the pins 73 reaching the portions 77 of the slots 75 will cause the plates to be moved inwardly toward one another. Fixed to each of plates 72 is a pin 78 projecting toward the wall 15 and so positioned that as the pins 73 reach the portion 77 of the slots 75, the pins 78 will enter the notches 67 in the arms 61 of said bolts 60, so that as the plates 72 are pivoted inwardly toward one another, the pins 78 engaging within the slot 67 will cause sliding movement of the bolts 60 toward one another to cause the arm 63 of said bolts to engage within the openings 63a in the keeper. Actuation of the knob or the key actuated mechanism in a direction to unlock the lock, will cause the horizontal bolt to be retracted for first pivoting the plates 72 outwardly away from one another to slidably move the bolts 60 away from each other and disengage the arms 63 thereof from the openings 63a and to thereafter retract the bolt 32 together with its bolts 60 into the casing.

It will now be understood that when the lock, heretofore described, is closed by means of the key actuated mechanism, for example, from the outside of the door, the lock cannot be unlocked by turning the knob, for example, from the inside of the door. Thus when the proprietor, for example, of a premises leaves the premises and locks the lock by means of the key, a burglar may enter the premises through the window, but cannot turn the knob to unlock the lock. However, heretofore with locks, for example, of the character shown and described in said patent of Frederick W. Heyel, it would be possible to remove the fastening screws which attach the lock casing to the door and thus remove the lock entirely from the door.

Means is therefore provided to prevent the lock casing from being removed from the door when the lock is in locked condition. To this end, there is superimposed over the cover plate 23 a location plate 80 shown in detail in Figs 10 and 11 of the drawings. The location plate is covered by the casing and rests on the cover plate, and cannot be reached from the outside of the lock casing. The wall 16 of the casing may, however, be formed with grooves for receiving tongues 81 having edges 82 adapted to be set flush with the edge of the door for positioning the opening 85 whereby the exact position of the key tumbler may be ascertained. The location plate is fixed to the door by means of the usual screws on the tumbler extending through the openings 86, these screws not being accessible from the outside of the lock casing, as shown in our co-pending application Ser. No. 632,288, filed Sept. 9, 1932. The location plate is provided with a pair of spaced, preferably integral, forked members or portions 88 extending into the casing and each having a slot 89. Fixed to the portion 37 of the bolt and adjacent the ends 38 thereof, are a pair of pins 90 each having a head 91. The forks 88 are so located that when the bolt is in the fully projected position thereof, shown in Fig. 6 of the drawings, the pins 90 will enter the slots 89 and the heads 91 will engage the forked arms 88.

It will thus be seen that when the lock is in locked condition, the forked portions 88 engage the heads 91 so that should the usual attaching screws be removed from the casing itself, the lock would nevertheless be still attached to the location plate by means of the engagement of the pins 90 with the forked members 88 and hence removal of the lock would be prevented.

Furthermore, the plates 72 may be provided with symmetrically disposed notches 92 on the inner edges thereof, and a pin 95 having a head 96 may be attached to the inner side of the location plate, said pin being so located that when the horizontal bolt is in the fully projected position thereof and the plates 72 have been pivoted toward one another, the pin 95 will be received within the notches 92, and the head 96 will engage the inner surfaces of the plates 72. With this construction also, upon removal of the attaching screws for the lock casing, the lock cannot be removed by reason of the fact that the plates 72 engage the pin 95 and its head 96. The cover plate, of course, must be formed with suitable openings 98 to permit the forked portions 88 to pass therethrough, and with an opening 99 to permit the pin 96 to pass therethrough. If desired, the forks 88 or pin 95 may be omitted. The portion 37 is formed with a slot 37a receiving head 96 of pin 95.

In the lock shown in Figs. 5, 6, 7 and 8 of the drawings, the plate 54 with its pins 58 and 59 and the knob 48 may be replaced by the usual key tumblers on opposite sides of the lock connected to the main bolt in the usual manner well known in the art. In such case likewise, when the lock is in locking condition, the location plate with the forks 88 or the pin 95 prevent the lock casing from being removed from the door by unscrewing the usual attaching screws.

Figure 9:
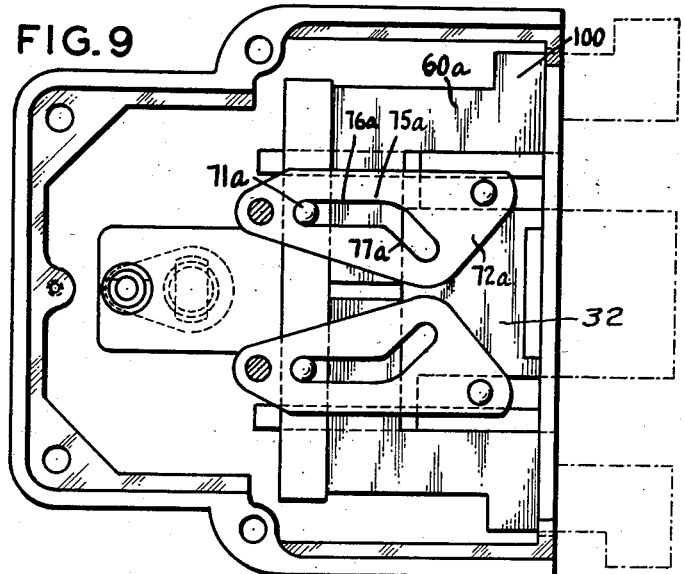
Fig. 9 is a rear elevational view of a lock embodying the invention illustrating a modified construction.

In Fig. 9 of the drawings, there is shown a lock having a central bolt 32, but provided with vertical bolts 60a substantially similar to the bolt 60 but having arms 100 extending away from one another instead of toward each other, as are arms 63. With this construction, the pivot plates 72a are provided with slots 75a having portions 76a parallel to one another when the bolts are in retracted position, and portions 77a normally extending toward one another when the bolts are in retracted position, instead of extending away from each other, as in Fig. 5 of the drawings. With the construction shown in Fig. 9, upon projecting the horizontal bolt the vertical bolts will likewise be projected. When the pins 71a however, fixed to the horizontal bolt, reach the portion 77a of the slots, the vertical bolts 60 will be moved away from each other to engage the arms 100 in suitable openings in a keeper.

Figure 2:
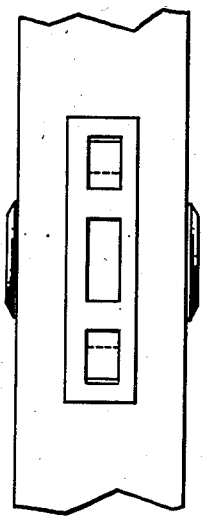
Fig. 2 is an end elevational view of the door shown in Fig. 1.
Figure 3:
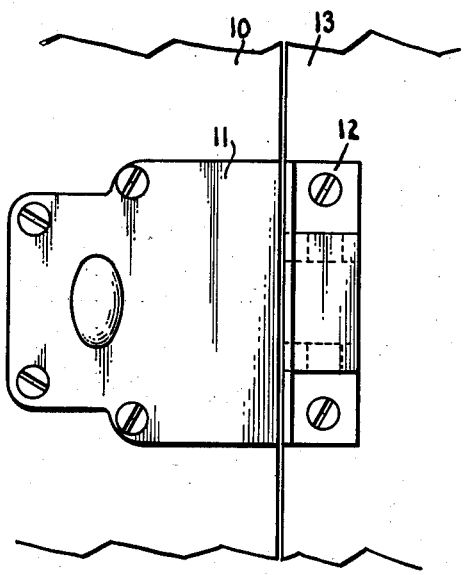
Fig. 3 is a side elevational view of a door and door jamb provided with a rim lock embodying the invention.
Figure 4:
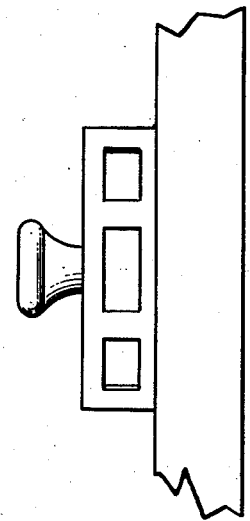
Fig. 4 is an end elevational view of a door and lock shown in Fig. 3.
Figure 5:
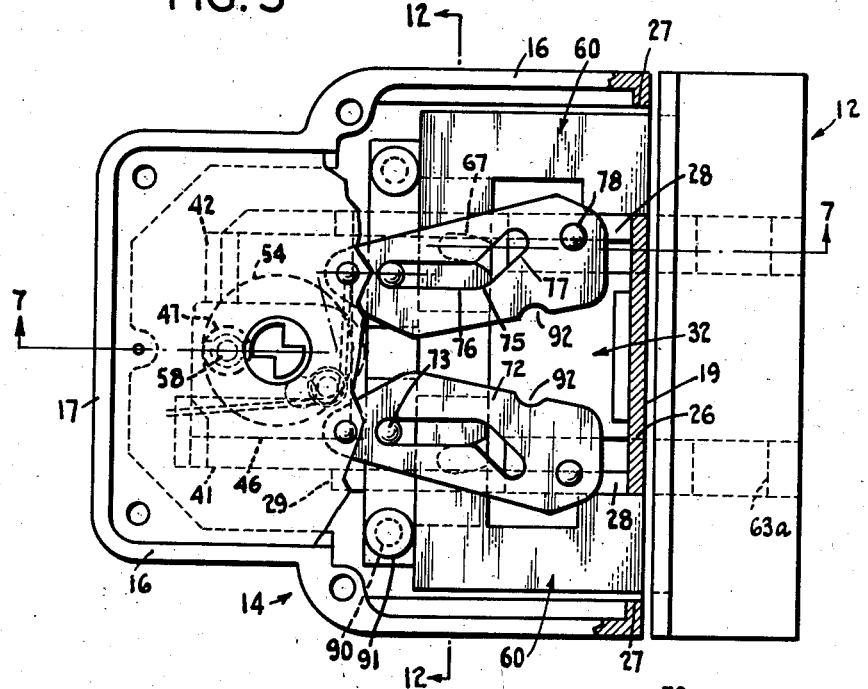
Fig. 5 is a rear elevational view of the lock with parts broken away to show the interior construction.
Figure 6:
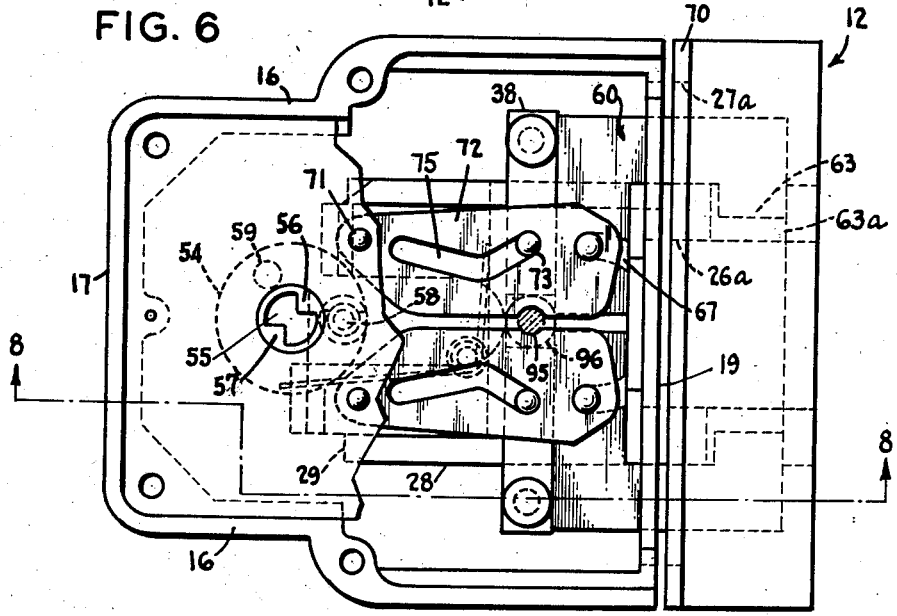
Fig. 6 is a view similar to Fig. 5, but shows the lock in locked condition.
Figure 7:
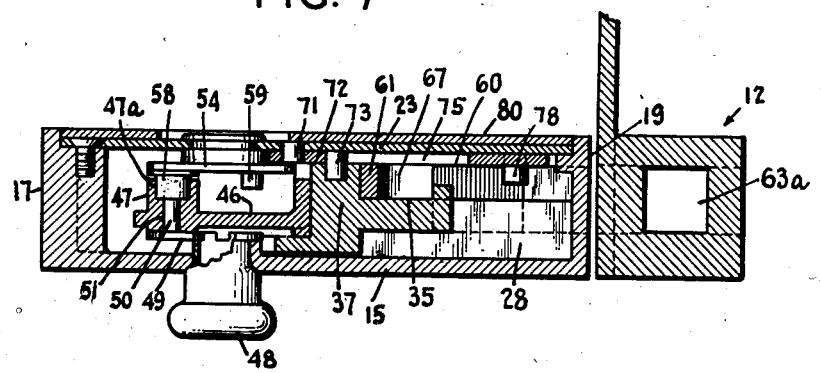
Fig. 7 is a cross-sectional view taken on line 7—7 of Fig. 5.
Figure 8:
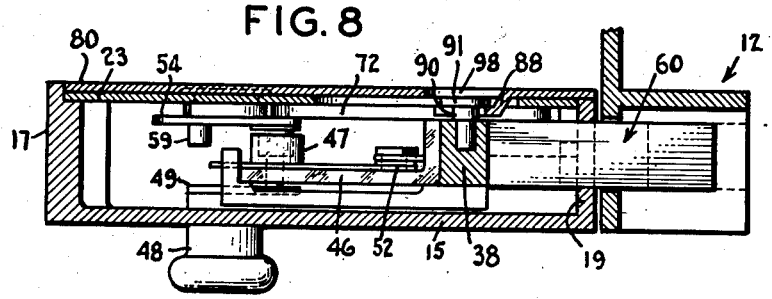
Fig. 8 is a cross-sectional view taken on line 8—8 of Fig. 6.

As shown in Figs. 1 and 2 of the drawings, the lock may be in the form of a mortise lock actuated either by a key on one side and a knob on the other side, or by keys on opposite sides, in the conventional manner for actuating the bolt. In such case the location plate may be omitted.

It will thus be seen that there is provided a device in which the several objects of this invention are achieved, and which is well adapted to meet the conditions of practical use.

As various possible embodiments might be made of the above invention, and as various changes might be made in the embodiments set forth, it is to be understood that all matter herein set forth or shown in the accompanying drawings is to be interpreted as illustrative and not in a limiting sense.

Having thus described our invention, we claim as new and desire to secure by Letters Patent:

1. A lock comprising a bolt and formed with a groove, an additional pair of similar, symmetrically disposed bolts having aligned arms slidably received within said groove, second arms extending at right angles to said first arms, and respectively, aligned third arms parallel to said first arms, respectively, means for slidably moving all of said bolts in one direction and means for causing sliding movement of said pair of bolts in a direction transverse to the sliding movement of said first bolt.

2. A lock comprising a casing, a bolt slidably mounted therein, a second bolt having an arm slidably mounted on said first bolt for movement in a direction transverse to the movement of said first bolt, said second bolt having a second arm parallel to the direction of movement of said first bolt and a third arm parallel to said first arm, means for reciprocating said first bolt, a member pivoted with respect to said casing and having a slot, and a pin on said first bolt received within said slot, the first arm of said second bolt having a slot, and a pin on said pivoted member adapted to engage within said last mentioned slot.

3. A lock comprising a casing, a bolt slidably mounted therein and adapted to be projected therefrom, means for reciprocating said bolt, a pair of similar, symmetrically disposed bolts, each having an arm slidably mounted on said first bolt, and means for causing slidable movement of said pair of bolts in opposite directions upon projecting said first bolt, said means comprising a pair of symmetrical plates having slots and pivoted to said casing at adjacent ends, said first bolt having pins projecting into said slots, and said plates having pin and slot connections with said pair of bolts during part of the pivotal movement of said plates.

4. A lock comprising a casing, a bolt slidably mounted therein, a second bolt having an arm slidably mounted on said first bolt for movement in a direction transverse to the movement of said first bolt, said second bolt having a second arm parallel to the direction of movement of said first bolt and a third arm parallel to said first arm, means for reciprocating said first bolt, a member pivoted with respect to said casing and having a slot, and a pin on said first bolt received within said slot, the first arm of said second bolt having a slot, and a pin on said pivoted member adapted to engage within said last mentioned slot, the pin on said pivoted member being movable out of the slot in said second bolt.

5. A lock comprising a casing, a bolt slidably mounted therein, a second bolt slidably mounted on said first bolt for movement in a direction transverse to the movement of said first bolt, means for reciprocating said first bolt, a member pivoted with respect to said casing and having a pin and slot connection with said first bolt, said second bolt having a slot and a pin on said pivoted member adapted to engage within said slot and movable out of said slot.

CHARLES KEMP.
IRVING KEMP.